United States Patent [19]
Jensen

[11] Patent Number: 5,133,058
[45] Date of Patent: * Jul. 21, 1992

[54] PAGE-TAGGING TRANSLATION LOOK-ASIDE BUFFER FOR A COMPUTER MEMORY SYSTEM

[75] Inventor: Eric H. Jensen, Livermore, Calif.

[73] Assignee: Sun Microsystems, Inc., Mountain View, Calif.

[*] Notice: The portion of the term of this patent subsequent to Nov. 6, 2007 has been disclaimed.

[21] Appl. No.: 408,697

[22] Filed: Sep. 18, 1989

[51] Int. Cl.$^5$ .................. G06F 12/10; G11C 15/00
[52] U.S. Cl. .......................... 395/400; 365/49
[58] Field of Search ... 364/200 MS File, 900 MS File

[56] References Cited

U.S. PATENT DOCUMENTS

| | | | |
|---|---|---|---|
| 3,675,215 | 7/1972 | Arnold et al. | 364/200 |
| 4,096,573 | 6/1978 | Heller et al. | 364/200 |
| 4,277,826 | 7/1981 | Collins et al. | 364/200 |
| 4,356,549 | 10/1982 | Chueh | 364/200 |
| 4,628,451 | 12/1986 | Sawada et al. | 364/200 |
| 4,654,777 | 3/1987 | Nakamura | 364/200 |
| 4,961,135 | 10/1990 | Uchihori | 364/200 |
| 4,969,122 | 11/1990 | Jensen | 364/200 |
| 4,991,081 | 2/1991 | Bosshart | 364/200 |
| 5,003,459 | 3/1991 | Ramanujan et al. | 364/200 |

*Primary Examiner*—Terrell W. Fears
*Assistant Examiner*—Michael A. Whitfield
*Attorney, Agent, or Firm*—Blakely, Sokoloff, Taylor & Zafman

[57] ABSTRACT

A caching memory system including a translation look-aside buffer having a preselected number of lines of memory, each of said lines including storage for a virtual address and a physical address, apparatus for selectively varying the size of pages the virtual and physical addresses of which may be stored in the translation look-aside buffer, and apparatus for interrogating the virtual addresses to determine whether a requested address is stored in the translation look-aside buffer.

11 Claims, 4 Drawing Sheets

PAGE-TAGGING TRANSLATION LOOK-ASIDE BUFFER FOR A COMPUTER MEMORY SYSTEM

BACKGROUND OF THE INVENTION

1. Field of the Invention

This invention relates to computer systems and, more particularly, to apparatus for addressing information in computer systems using virtual memory.

2. History of the Prior Art

Cache memories are used in computer systems to speed the overall operation of the system. The theory of a cache is that a system attains a higher speed by using a small portion of very fast random access memory (RAM) as a cache along with a larger amount of slower main memory random access memory. If data and instructions are called from main memory and placed in cache memory as they are required by the program, and if the system looks first to the cache memory when processing instructions and information to see if the information required is available there, then the system will usually find the information desired in the cache memory and will, consequently, operate at a speed as though it were made up mostly of high speed cache memory. This occurs because, statistically, information in any particular portion of a process which has just been used is more likely to be required immediately than is other information which has not been recently used.

There have been many forms of caching systems devised by the prior art. One way to design a cache memory used in a demand paged virtual memory system is to make the cache memory the same size as one of the main memory pages. When, in such a system, information is taken from main memory and placed in a cache memory, it may be stored in the same line of the cache memory as the line of the page from which it was accessed in main memory along with its virtual page address in main memory. If, on the other hand, the page size in main memory is a multiple of the cache size, then a few extra bits (depending on the multiple) are needed in the line address to specify the section of the page from which it came. In any case, each line of such a cache memory may come from any particular page of main memory so that lines lying adjacent each other in cache memory may have entirely different virtual page addresses. The virtual page address, a series of high order bits of the address, is usually stored as part of a tag field which in addition to the page address includes protection and control information such as whether the information is read or write protected and whether the information is valid. In a particular system, such a tag field may require approximately sixteen bits to represent the tag information.

A system uses the low order bits of the virtual address (the offset) to select the line in which information is stored in such a cache memory. Once the line is selected, the system determines whether the required information is in the cache memory (whether there is a hit) by looking for the correct virtual page address in the tag field of that line. If the page address in the tag field at the desired line in the cache memory matches the desired page address, then there is a hit; and the information in the cache memory may be used without the necessity of going to main memory. If the page address does not match, indicating that the information is not present in the cache memory, then the system must delay, go to main memory, replace the particular line in the cache memory, and finally operate on the information.

Of course, such a system does have disadvantages. When there is miss in the cache memory, several clock times may have passed before main memory is accessed for the missed information. In addition, the system uses quite a bit of address space in the cache memory to provide the tags to designate page addresses, protections, and the like. When multiplied by the lines of the cache memory, a substantial amount of memory space is required.

When the information sought is not contained in the cache memory, then it is necessary to find the information in physical memory and provide it to the cache memory for use. In such a case, the physical address of the information must be provided in order for the information to be obtained and written to the cache memory for use by the computer system. Normally this is accomplished in the following order. The virtual address is first used to address the cache memory (data or instruction cache) to first determine whether the information is available in the particular cache memory (whether a cache hit or a cache miss occurs). If a cache miss occurs, then the virtual address is directed to a set of often multiple-level page map tables which translate the virtual address to the physical address. Once the physical address is obtained, the information may be written into the particular cache memory and used by the central processing unit. It will be appreciated that such a process is relatively time-consuming and substantially slows the overall operation of the computer system.

To obviate this problem, certain computer systems have provided a buffer memory often called a translation look-aside buffer for storing both the virtual and comparable physical addresses of information recently utilized by the computer. Before going to the page map tables to translate the virtual address to a physical address, the system looks to the translation look-aside buffer to see if the virtual address is stored in that buffer. If it is, then the physical address of the information sought is immediately available, and the slower process of consulting the page map tables to determine the physical address is not necessary.

Computer systems often use multiple processors to allow various functions to be handled by other than the central processing unit (CPU) so that the speed of the overall system is increased. When multiple processors are used in a system, it is often advantageous to utilize an individual cache memory (or memories) with each processor in order to enhance the speed of operation of that processor. One special advantage offered by multiple cache memories in virtual memory systems is that the processors may share the same information because they may address the same physical memory. However, this ability of multiple processors to share the same information creates a data consistency problem because write operations which change the data in a particular cache memory associated with a particular processor may not be reflected in the physical memory shared by all of the processors or in other cache memories allowing other processors to share the same information. Consequently, multiprocessor computer systems utilizing virtual cache memories must provide some method of either indicating that information in a cache memory is stale or updating the stale information so that it will not be used by the system.

An additional problem occurs in systems using cache memory and translation look-aside buffers, there are sometimes cases where the page size used in virtual memory is not appropriate to the type of information being used. For example, if attempts are made to store very large arrays of scientific numbers in a virtual memory arrangement having a page size of sixty-four Kbytes, a translation look-aside buffer dealing with such information may have to deal with so many individual pages that it will begin thrashing and its advantage will not be realized. For this reason, it may often be desirable to effectively eliminate the virtual memory system. This may be done by allowing a system to select an extremely large page size such as sixteen Mbytes. However, translation look-aside buffers of the prior art adapted to operate with a first page size have not been able to operate with other page sizes of virtual memory.

SUMMARY OF THE INVENTION

It is, therefore, a general object of the present invention to improve and accelerate the operation of computer systems.

It is an additional object of the present invention to reduce the size of any particular cache memory needed in a computer system.

Another object of the present invention is to increase the speed of operation of a translation look-aside buffer.

Another object of the present invention is to provide a translation look-aside buffer capable of operating with different page sizes of virtual memory.

These and other objects of the invention are realized in a caching memory system including a translation look-aside buffer having a preselected number of lines of memory, each of said lines including storage for a virtual address and a physical address, apparatus for selectively varying the size of pages the virtual and physical addresses of which may be stored in the translation look-aside buffer, and apparatus for interrogating the virtual addresses to determine whether a requested address is stored in the translation look-aside buffer.

Such a translation look-aside buffer may cooperate with a cache memory from which the page address portion of the tag field has been removed to reduce the size of the address space needed in the cache memory. The combination of the particular cache memory and the particular translation look-aside buffer is adapted to operate much more rapidly than previous arrangements in invalidating cache memories.

These and other objects and features of the invention will become apparent to those skilled in the art by reference to the following detailed description taken together with the several figures of the drawing in which like elements have been referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. The algorithms presented herein are not inherently related to any particular computer or other apparatus.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention describes apparatus for operating a computer in processing electrical or other (e.g. mechanical, chemical) physical signals to generate other desired physical signals.

DESCRIPTION OF THE PREFERRED EMBODIMENT

Figure 1:
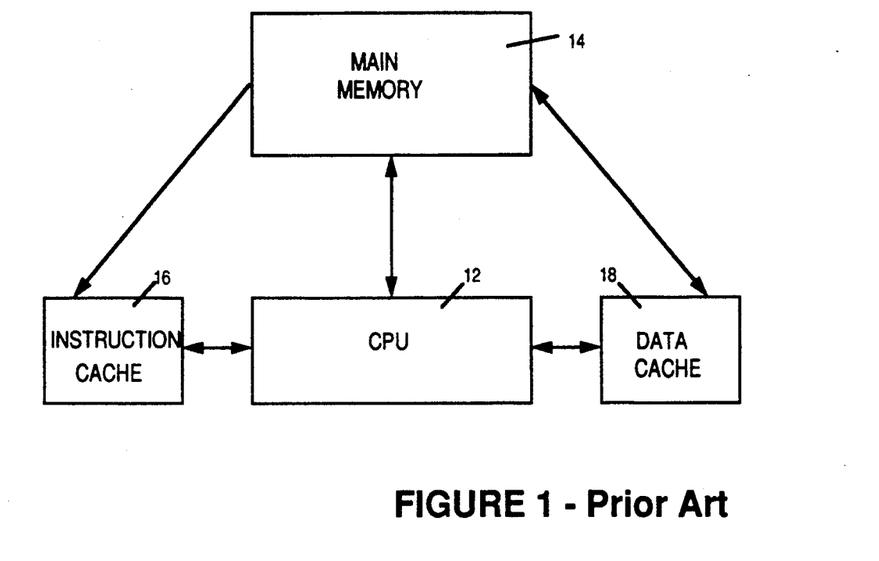
FIG. 1 is a drawing illustrating one form of computer system utilizing cache memory in a computer memory arrangement.

Referring now to FIG. 1 there is shown a block diagram of a computer memory caching system. The system 10 illustrated includes a central processing unit 12, a main memory 14, an instruction cache memory 16, and a data cache memory 18. Although instructions and data are often sequestered in individual cache memories as are shown in FIG. 1, this is not always the case nor is it necessary to the theory of the invention that this be true.

Figure 2:
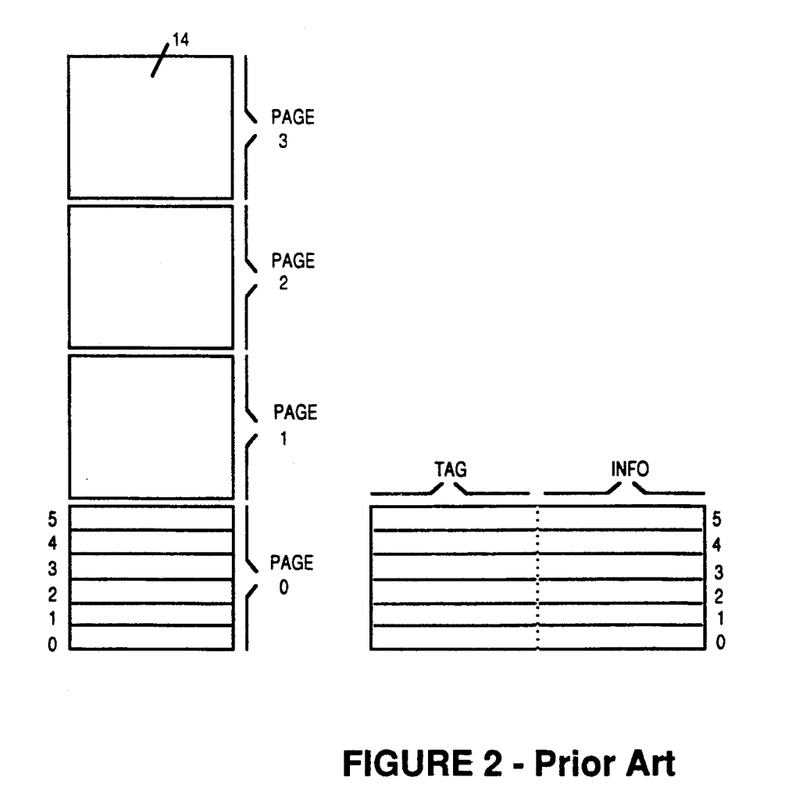
FIG. 2 is a block diagram illustrating the makeup of main and cache memories in a caching system such as that illustrated in FIG. 1.

In some cache memory systems of the prior art, the main memory 14 (usually random access memory) is divided into a number of fixed pages of a predetermined size, height, and width. Then, each of the cache memories is designed to provide storage for the amount of information contained in one page of main memory. Thus, main memory size is essentially a multiple of cache memory size. Thsi is illustrated in the drawing of FIG. 2 where main memory 14 is shown divided, for example, into four individual pages designated pages 0-3. In discussing the system 10, the various values placed on elements of the system are for illustrative purposes only; and it will be appreciated by those skilled in the art that the usual main memory may or may not be larger than four pages of memory. Since each page in main memory is of the same height, each page has the same number of lines of storage. Since each page is of the same width, each line contains the same number of bits (four bytes or one word in an exemplary system). Consequently, any byte or word in the main memory 14 may be addressed by designating its page number, its line, and its position on the line. Of course, in such a system, the page size in main memory may be a multiple of the cache size rather than the same size as the cache memory. In such a case, a few extra bits (depending on the multiple) are needed in the line address to specify the section of the page from which the information came.

When, in such a system, information is taken from main memory 14 and placed in one of the cache memories 16 or 18 (whether the cache memory be used for instructions, data, or both), the virtual page address of that information in main memory 14 is stored along with the information at the same line of the cache memory as the line from which it was derived in the page of the main memory. Thus, the information stored at each line in a cache memory resides in the same line as in the page of main memory from which it was derived so that only the page address need be stored in the line of cache memory to determine whether the information required to be accessed is in the cache memory (whether there is a hit).

The virtual page address, a series of high order bits of the address, is stored as part of a tag field which in addition includes protection and control information such as whether the information is valid, whether it is read or write protected, and the like. These bits of information are often referred to as permissions. In a preferred system, such a tag field may require approximately sixteen bits to represent the tag information. It should be understood that each line of either of the cache memories 16 or 18 in such a system may come from any particular page of main memory 14; consequently, lines lying adjacent each other in cache memory 16 may have entirely different tags designating entirely different pages of main memory.

In the cache memory 16 illustrated in FIG. 2, this page address and the permission information is stored in the tag portion of each line shown to the left edge of the cache memory 16 in the Figure, that additional space beyond the space required for the storage of the instruction or the data on each line. It will be understood that the portion of the cache memory 16 necessary to accomodate the tag portion of the address is relatively significant. Since cache memory is involved, the space is also fast memory which is expensive.

When the central processing unit 12 of such a prior art system first looks to one of the cache memories 16 or 18 to determine whether any required information is present, a comparison of the desired address with the addresses of the information stored in cache memory is made. This is done by first comparing the line address sought with the lines of the cache memory to select the correct line. When the correct line has been selected, the virtual page address stored in the tag field at that line of the cache memory 16 is compared to the page address sought. If a page address in the tag field of the cache memory 16 matches the desired page address, then there is a hit; and the information in the cache memory is used without the necessity of going to main memory 14 to complete the search. If the page address at the selected line does not match, the information is not present in cache memory; and the system must go to main memory 14 to secure the information and replace the particular line in the cache memory 16. Only then can the central processing unit 12 operate on the information in the usual system.

Figure 3:
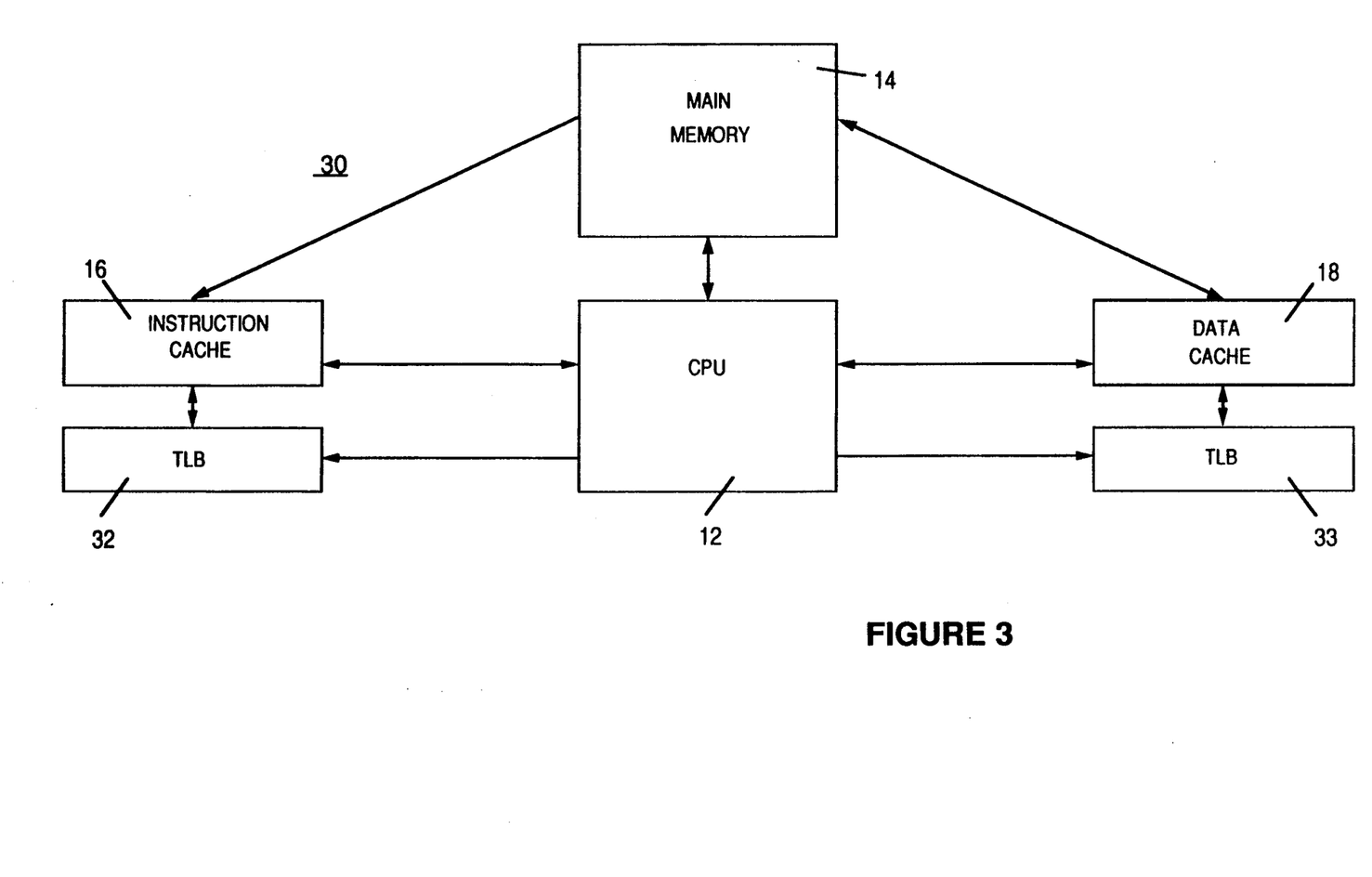
FIG. 3 is a block diagram illustrating a computer system including the combination of a caching system and a translation look-aside buffer in accordance with the present invention.

FIG. 3 illustrates a caching system 30 devised in accordance with the present invention which substantially reduces the problems of the above-described system. The system 30 illustrated in FIG. 3 includes a central processing unit 12, a main memory 14, an instruction cache memory 16, and a data cache memory 18 all as illustrated in FIG. 1. Associated with the instruction cache memory 16 is a translation look-aside buffer 32. Associated with the data cache memory 18 is a second translation look-aside buffer 33.

The system 30 illustrated in FIG. 3 operates in many ways like that of the prior art. The system 30 illustrated in FIG. 3 is an improvement on the invention disclosed in U.S. Pat. No. 4,969,122, entitled APPARATUS FOR PAGE TAGGING IN A COMPUTER SYSTEM, Eric H. Jensen, issued Nov. 6, 1990. Information stored in main memory 14 is, when required by the process, stored in one of the cache memories 16 or 18 along with an indication of its virtual page address. However, in the system 30, the address stored in the tag field at each line in the cache memory 16 to represent the virtual page address comprises only a small number of bits, less than the number of bits normally used to represent the page address and the permissions. Rather than allowing lines from all of the pages in main memory to be stored in one of the cache memories, the system 30 allows information from only a small number of pages of the main memory 12 to be stored in one of the cache memories at one time. In the example illustrated in FIG. 4, only two pages are allowed to be stored in the cache at one time. Actual embodiments may store four, eight, or sixteen pages at one time depending on whether the cache is for data or instructions and the type of use the system is expected to see.

Using the example, if the main memory 14 included sixteen individual pages of memory, only two of these pages could be represented in the illustrated cache memory at the same time. Although this restriction may appear to be limiting, the same statistical information which allows hit rates as high as ninety-five percent argues that in most programs, information necessary within particular segments of processes will fall usually into one, two, or three pages of main memory. Consequently, such a restriction, at least with a divided caching system holding instructions and data in different cache memories, places little actual limitation on the system.

Figure 4:
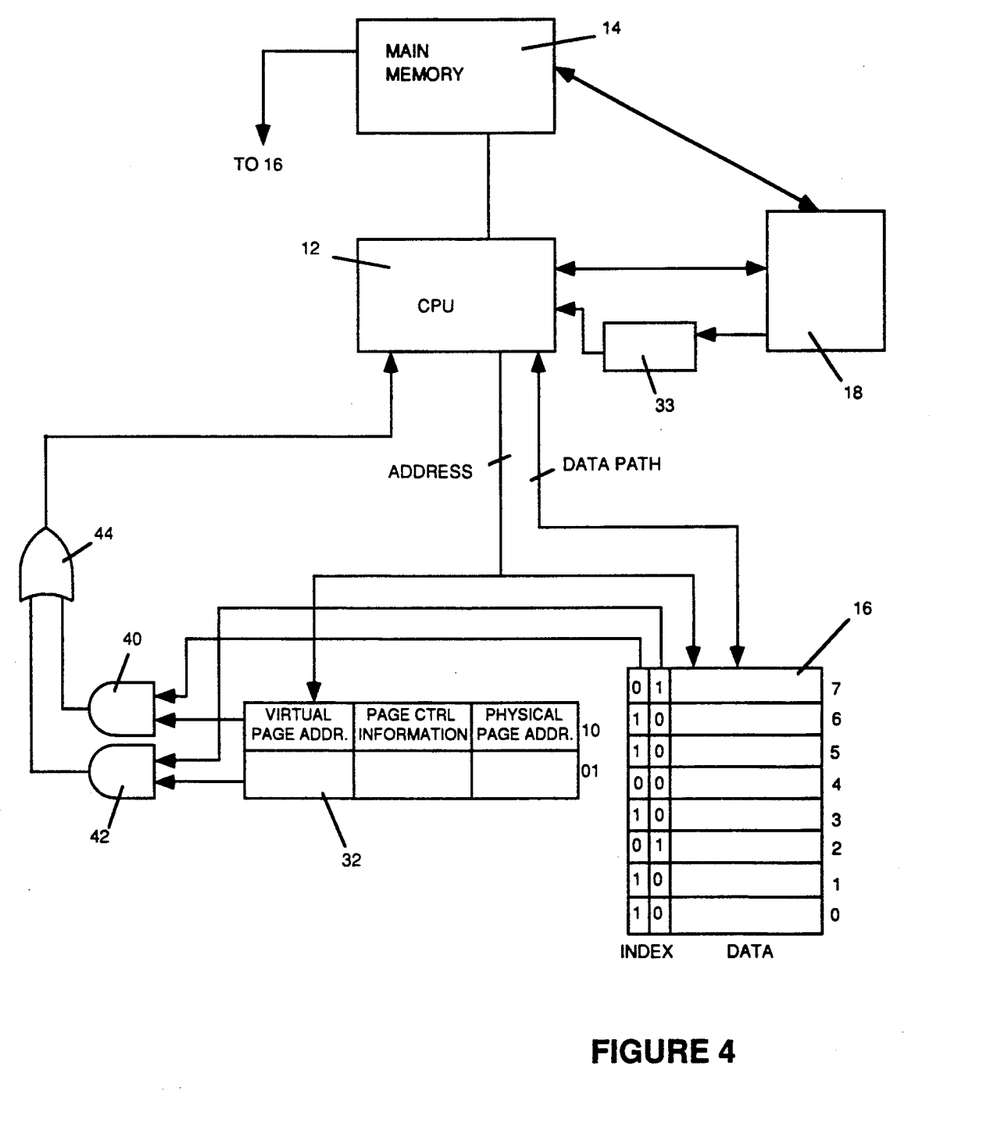
FIG. 4 is a block diagram illustrating in detail the combination of a caching system and a translation look-aside buffer illustrated in FIG. 3.

The advantages of this restriction are great, however. By allowing only information from two pages of main memory to reside in a cache memory at one time, only two bits need be used to designate, in the tag address space of the cache memory, the virtual page from which the information came. This eliminates approximately sixteen bits from each line of the cache memory. This is possible because each one of the two bits represents one or the other of two lines in the associated translation look-aside buffer 32. The two bits then act as an index into the translation look-aside buffer which provides the full virtual page address. Each translation look-aside buffer 32 and 33 is constructed in the exemplary arrangement as illustrated in FIG. 4 with two lines of bits, each line having a sufficient number of bits to record the tag field including the virtual page address of one of the pages of main memory residing in the associated cache memory, the permission bits for that page of memory, and the physical address of the information stored under that virtual page address. Thus, essentially the entire tag address field is removed from the cache memories and placed in the translation look-aside buffer 32 where it appears but once per page instead of as many times as there are lines in the cache memory. This is a significant savings in fast, high priced memory.

Instead of the full tag address field, the index field in the cache memory 16 used for illustration herein holds a one or a zero in each of the two bits indicating the virtual addresses of the particular pages of main memory 14 stored in the cache memory. For example, if a one appears in the first position, this indicates the page in the upper of the two lines held in the associated translation look-aside buffer 32; if the second position holds a one, then the lower of the two lines in the translation look-aside buffer 32 is indicated. If neither bit position holds a one, this may be used to indicate that the information in that line of the cache memory is invalid and is not to be used. If more pages from main memory are allowed to be stored in the cache memory at one time, then more bits more are required in the index field of the cache line.

If a "1" appears in any bit position of the index field in the cache memory, the system looks to the translation look-aside buffer 32 to provide a match of the virtual page address. Assuming a match exists, the physical page address and the protection and control information for the addressed line of the cache memory 16 is provided. In the illustration of FIG. 4, the cache memories 16 and 18 are restricted to only two pages of main memory. The upper line of the translation look-aside buffer 32 provides the page address for all lines of one of the two pages which may at any one time be stored in the cache memory 16 while the lower line provides the page address for all lines of the other of the two pages which may be stored in the cache memory 16.

As in prior art systems, a check for a hit in the cache memory 16 is made by matching the lower order line address bits of the address sought with the line addresses in the cache memory to select the proper line. The index field at the matched line indicates the appropriate tag address field including the virtual page address, and the translation look-aside buffer 32 provides a match signal on the one of the two match lines which holds the appropriate page address. This match signal and the signal from the appropriate line of the cache memory 16 are provided to select either an AND gate 40 or an AND gate 42. The selected AND gate 40 or 42 provides an output to an OR gate 44 signifying that there is both a virtual page address match and a index field match at the selected line address so that the information may be utilized. On the other hand, if neither line of the exemplary translation look-aside buffer 32 holds a matching page address, there is no match; and the central processing unit 12 must go to the main memory for the required information.

As in prior art systems, the translation look-aside buffer 32 stores both the virtual and comparable physical page addresses of information in the cache memory. Thus, if there is a virtual page match in the translation look-aside buffer 32 but no line address match because information at that line is from a different page, then the physical page address of the information sought is immediately provided in response to the virtual page address, and the slower process of consulting the page map tables in order to determine the physical address of the information is not necessary. The physical address of the information is immediately available so that the information may be accessed from the main memory and written to the cache memory for use by the central processing unit. Moreover, the permissions for each page are also immediately available so that if the information at the address is stale, for example, even though the line and virtual page address match, the physical address may be immediately accessed for up-to-date information to be used and written to the cache memory.

Figure 5:
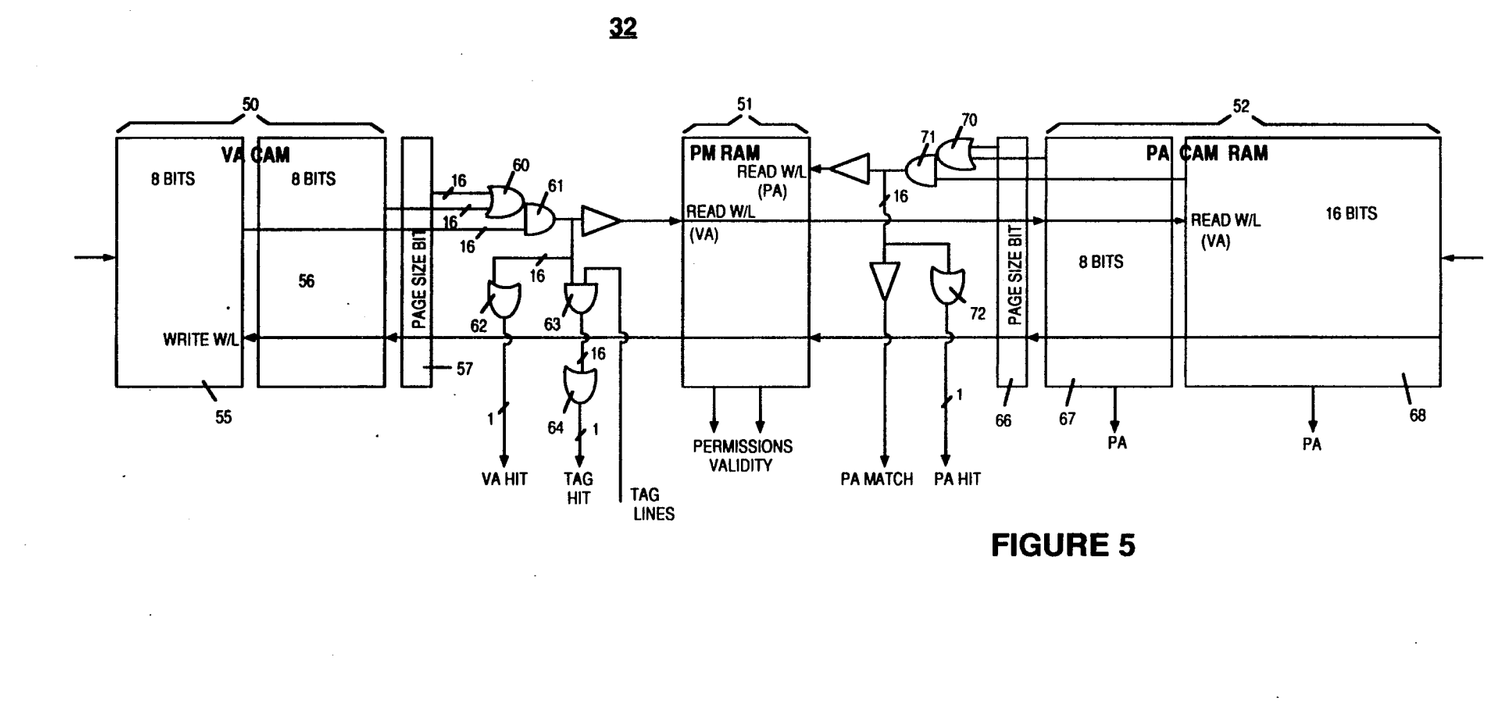
FIG. 5 is a block diagram illustrating in detail the translation look-aside buffer of this invention.

FIG. 5 illustrates a translation look-aside buffer 32 constructed in accordance with the invention. The buffer 32 includes a number of lines sufficient to store a selected number of pages of main memory as described above; in the preferred embodiment four pages are stored at one time in the instruction cache memory 16 and sixteen pages are stored at one time in the data cache memory 18. The diagram of FIG. 5 illustrates the embodiment of the data cache memory which stores data from sixteen different pages of main memory. Each line of the buffer 32 is divided into three philosophically distinct parts, a virtual address portion 50, a permissions portion 51, and a physical address portion 52. The virtual address portion 50 in the preferred embodiment may be constructed as content addressable memory. The permissions portion 51 may be constructed as random access memory. The physical address portion 52 may be constructed either as content addressable memory or as random access memory. If constructed as content addressable memory, the physical address portion may be utilized to rapidly find physical pages stored in cache memory which need to be updated because of writes to other cache memories.

The virtual address portion 50 is divided into a first eight bit portion 55, a second eight bit portion 56, and a third one bit portion 57. The single bit in portion 57 of each line entry allows the buffer 32 to be utilized to select two different page sizes of main memory. In a preferred embodiment of the invention, page sizes of either sixty-four Kbytes or sixteen Mbytes may be utilized in main memory. It will be recognized that many fewer bits are required to specify the particular page when the page size is sixteen Mbytes than is necessary when page size is sixty-four Kbytes, since there will be many fewer pages. Thus, if a one is contained in the bit position of portion 57, page sizes are sixteen Mbytes and a page match comparison is done only with the bits stored in portion 55. On the other hand, if a zero is contained in the bit position of portion 57, page sizes are sixty-four Kbytes and a page match comparison is done with the bits stored in both of portions 55 and 56. This provision for the translation look-aside buffer allows the buffer to be used with pages of the two different sizes and provides the advantages explained above.

The page address match is accomplished through the use of comparators, one of each line of the translation look-aside buffer 32, which compare the virtual page address sought with the page address of the line and provide an output signalling a match and an output signalling the size of the page. Such comparators are well known and may, for example, utilize AND gates to compare the desired address with the stored address to signal a match. The page address match for the particular cache size is signalled for each line of the translation look-aside buffer 32 to an OR gate 60 and an AND gate 61. If the page size is sixteen Mbytes, a one from a line in portion 57 provides a signal transferred by the OR gate 60 to one terminal of the AND gate 61 forcing a match on the lower eight bits of the entry from portion 55. A match of the virtual page in the eight bits of the portion 55 provides the other input to the AND gate 61. The signal from the AND gate 61 is furnished to an OR gate 62 to signal a virtual page address hit. If page size is sixty-four Kbytes, a zero is contained in portion 57 for the entry so a match is required in the eight bits of portion 56 of the virtual address to provide a signal which will be transferred by the OR gate 60 to one terminal of the AND gate 61. A match in the other eight bits of the portion 55 of the virtual page provides the other input to the AND gate 61. The signal from the AND gate 61 is furnished to the OR gate 62 to signal a virtual address hit.

The signal from the AND gate 61 is also provided to an AND gate 63 (equivalent to gates 40 and 42 in FIG. 4). The other input to the AND gate 63 is the signal from the cache memory 32 indicating the page tag bit. If the page tag bit provides a one input and a match of the page in the translation look-aside buffer 32 also occurs, this signal is transferred to an OR gate 64 equivalent to gate 44 in FIG. 4 to indicate a cache hit.

The permissions portion 51 of the translation look-aside buffer 32 contains bit positions to indicate whether the information may be accessed for read, for write, and whether the information is valid. When a match of the virtual address occurs, the permissions for the particular page appear at the output lines so that the system can check those values with the request for access to determine whether it should be granted. For example, a request to write to a read only page will cause the generation of an error exception to be handled by the central processing unit. Additionally, the physical address translation is read. This physical address is used to access main memory in the event of a cache miss. An indication from permissions portion 51 that the information at a particular address is invalid allows the central processing unit to immediately go to the physical address provided to access the up-to-date information and refill the cache. It should be noted that the portion 51 is constructed so that it may be interrogated upon either the virtual address match or a physical address match.

The physical address portion 52 of the translation look-aside buffer 32 is divided into a first one bit portion 66, a second eight bit portion 67, and a third sixteen bit portion 68. As with the virtual address portion 50, the single bit in portion 66 of each entry allows the buffer 32 to be utilized to select two different page sizes of main memory. It should be understood that the single bit positions illustrated in portions 57 and 66 need not be duplicated in the manner shown but would operate as well with only a single bit position for both the virtual and physical addresses. If page sizes are sixteen Mbytes, the physical address is provided by the bits stored in portion 68. On the other hand, if page sizes are sixty-four Kbytes, the physical address is provided by the bits stored in both of portions 67 and 68.

In order to allow the portion 52 to be used for addressing of physical addresses, comparator circuitry including a comparator for each line of the translation look-aside buffer 32 is provided within the portion 52. The comparator circuitry operates in the same manner as the comparator circuitry associated with the portion 50 but is used to match the physical addresses sought with the physical addresses stored in the translation look-aside buffer 32. Then, logic including an OR gate 70, an AND gate 71, and an OR gate 72 are utilized to provide an indication of a match in one or both of the portions 67 and 68 of the physical address portion 52. This logic operates as does the logic associated with the virtual address portion 50. The ability to interrogate the physical address portion 52 allows the comparison of a physical address with information stored in a cache. This is especially convenient when multiple caches are used with multiple processors and information in main memory may be utilized in more than one cache at the same time. If that information is written in one cache, it must be either invalidated or changed in the other before it can be used. This can be accomplished by snooping for the physical address in the translation look-aside buffer 32.

In a system using a translation look-aside buffer 32 constructed as disclosed herein, the validity of information may be tested against the information in the translation look-aside buffer 32 rather than in the cache memory. In this manner, the cache memories need not be taken over during the time that such a check is conducted and duplicate tags can be avoided. This can mean that there is no loss of system clock time involved in conducting a coherency check of a local cache memory. The translation look-aside buffer allows an easy coherency check to be accomplished by other portions of the system. The system simply looks for the physical address to which information has been written in the translation look-aside buffer. If the address is present, then a clear of the related virtual page bit in the cache memory tag immediately designates that line as containing invalid information.

The arrangement of this invention offers many other advantages. For example, If an attempted access of the cache memory 16 indicates a miss so that there is a need to access information outside the limited number of pages of main memory stored in the cache memory 16, it is necessary to replace one of the pages presently stored in the cache memory 16 with information from another page of main memory. In a preferred embodiment of the invention this is accomplished by utilizing cache memory which may be flash cleared in a manner well known to the prior art. Such memory may be cleared in all lines at a particular bit position. For example, all of the lines having a one in the first tag position might be set to zero in that bit position. As indicated above, if zeroes appear in both bit positions used in the cache memory 16 to indicate the page address, this may be utilized to indicate that the information is invalid at that page. Consequently, when the central processing unit next looks at the particular line and finds the indication of invalid information, it will fetch the required information from the main memory.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A high-speed cache memory system in a data processing system including a central processing unit (CPU) for processing data and a main memory divided into a number of main memory pages for storing data, said high-speed cache memory system comprising:
- translation look-aside buffer means for storing a plurality of page information lines, each page information line containing information associated with a corresponding main memory page having data represented in the cache memory system, each of said page information lines including a complete virtual page address, page control information, and a physical page address; and
- cache memory means for storing a number of cache entries, each of said cache entries including a data field for storing data and an index field for storing an index used to identify the particular page information line in the transaction look-aside buffer containing the page information associated with said data, wherein said index is smaller than said complete virtual page address.

2. The cache memory system set forth in claim 1 wherein the number of page information lines in said translation look-aside buffer means equals the number of main memory pages that can have data represented in the cache memory means simultaneously.

3. The cache memory system set forth in claim 1 wherein the index in the cache memory means is further used to indicate if said data in said data field is currently valid.

4. The cache memory system set forth in claim 1 wherein the total size of a predetermined number of cache entries in said cache memory means equals the size of one main memory page.

5. The cache memory system set forth in claim 1 further comprising an adjustable page size indicator used to indicate the size of a main memory page.

6. The cache memory system set forth in claim 1 wherein the virtual page address in the translation look-aside buffer is stored in content addressable memory.

7. The cache memory system set forth in claim 1 wherein the physical page address in the translation look-aside buffer means is stored in content addressable memory.

8. The cache memory system set forth in claim 1 wherein the page control information stored within the translation look-aside buffer means includes page permission status.

9. A method for storing data in a high-speed cache memory system in a data processing system including a central processing unit (CPU) for processing data and a main memory divided into a number of main memory pages for storing data, said method for storing data in a high-speed cache memory system comprising the steps of:
- storing page information in a translation look-aside buffer means, said page information associated with each main memory page having data represented in the cache memory system and including a complete virtual page address, page control information, and a physical page address; and
- storing in an entry of a cache memory means data and an index, said index corresponding to particular page information stored in the translation look-aside buffer means and said particular page information associated with said data;
- such that the page information stored in the translation look-aside buffer means associated with data stored in the cache memory means is accessed by using the index.

10. The method as set forth in claim 9 wherein page information is stored in said translation look-aside buffer means for only a predetermined number of main memory pages, said predetermined number equal to the number of memory pages that can have data represented in the cache memory means simultaneously.

11. The method as set forth in claim 10 wherein the index in the cache memory means is also used to indicate if said data is currently valid.

* * * * *